United States Patent
Schloms et al.

(10) Patent No.: US 8,448,836 B2
(45) Date of Patent: May 28, 2013

(54) TORSIONAL ULTRASONIC WELDING

(75) Inventors: Martin Schloms, Aachen (DE);
Sebastian Martens, Viersen (DE);
Franz-Josef Lietz, Oberhausen-Lirich (DE)

(73) Assignee: Auto Kabel Managementgesellschaft mbH, Hausen i.W. (DE)

( * ) Notice: Subject to any disclaimer, the term of this patent is extended or adjusted under 35 U.S.C. 154(b) by 87 days.

(21) Appl. No.: 12/990,348

(22) PCT Filed: Nov. 9, 2009

(86) PCT No.: PCT/EP2009/064823
§ 371 (c)(1),
(2), (4) Date: Oct. 29, 2010

(87) PCT Pub. No.: WO2010/060780
PCT Pub. Date: Jun. 3, 2010

(65) Prior Publication Data
US 2011/0048763 A1 Mar. 3, 2011

(30) Foreign Application Priority Data
Nov. 28, 2008 (DE) .................. 10 2008 059 481

(51) Int. Cl.
*B23K 20/10* (2006.01)
(52) U.S. Cl.
CPC .................. *B23K 20/10* (2013.01)
USPC ....................................... 228/110.1
(58) Field of Classification Search
CPC ....................................... B23K 20/10
USPC ....................................... 228/110.1
See application file for complete search history.

(56) References Cited

U.S. PATENT DOCUMENTS

| 6,538,203 | B1 | 3/2003 | Nolle et al. | 174/84 R |
| 7,374,466 | B2 * | 5/2008 | Onuma et al. | 439/874 |
| 7,598,456 | B2 | 10/2009 | Mertel | 174/84 R |
| 2006/0071054 | A1 * | 4/2006 | Bolser et al. | 228/124.6 |

FOREIGN PATENT DOCUMENTS

| DE | 10249569 | 5/2004 |
| DE | 202007009701 | 9/2007 |
| EP | 1032077 | 8/2000 |
| EP | 1688966 | 8/2006 |
| GB | 1125567 | 8/1968 |

OTHER PUBLICATIONS

European Patent Office, International Search Report—International Application No. PCT/EP2009/064823, dated Feb. 26, 2010, together with the Written Opinion of the International Searching Authority, 11 pages.

(Continued)

*Primary Examiner* — Nicholas P D'Aniello
(74) *Attorney, Agent, or Firm* — Sunstein Kann Murphy & Timbers LLP

(57) ABSTRACT

Connection of an aluminum stranded lead 2 to a connection part 10, comprising a stripped end 4 of the aluminum stranded lead 2 and a metal connection part 10 which is materially connected to the stripped end 4 of the aluminum stranded lead 2. An inexpensive welded connection can be produced in that an end face of the stripped end 4 of the aluminum stranded lead 2 is welded to the connection part 10 by means of torsional ultrasonic welding.

10 Claims, 3 Drawing Sheets

OTHER PUBLICATIONS

European Patent Office, Translation of International Search Report—International Application No. PCT/EP2009/06423, dated Feb. 26, 2010, 2 pages.

Germany Patent and Trademark Office, Office Action, Application No. 102008059481.4-34, dated Dec. 1, 2010, 3 pages.

The State Intellectual Property Office of the People's Republic of China, Office Action, Application No. 200980103038.9, dated Dec. 25, 2012, 7 pages.

* cited by examiner

TORSIONAL ULTRASONIC WELDING

TECHNICAL FIELD

The subject-matter relates to a connection of an aluminium stranded lead to a connection part, comprising a stripped end of the aluminium stranded lead and a metal connection part which is materially connected to the stripped end of the aluminium stranded lead. Furthermore, the subject-matter relates to a method for producing such a connection and also to a use of such a connection.

BACKGROUND ART

The connection of aluminium stranded leads/conductors/cables to connection parts, for example cable terminals made from copper or other non-ferric metals, is known for example from EP 1 032 077 A2. In this method, a material welded connection between the contact part and the cable is produced by means of a sleeve, said connection being substantially free from air inclusions between the individual strands of the aluminium stranded lead in the weld node. The aluminium strands and the aluminium sleeve form in the weld region a homogeneous, sealed weld node at which substantially no electrolyte can pass into the welded connection, thereby preventing contact corrosion.

One disadvantage of the method known from EP 1 032 077 A2 is the fact that the joining partners must be rotationally symmetrical. This significantly limits the scope of use of the method known from the prior art, since the joining partners have to be rotated coaxially relative to one another in order to use a rotational friction welding method, which means that the joining partners themselves are substantially rotationally symmetrical or at least can be clamped rotatably in a rotational friction welding tool. Due to the high speeds of rotation during rotational friction welding, asymmetries in the plane of rotation of the joining partners lead to imbalances which may have a negative effect on the welding process. Furthermore, in the case of rotational friction welding, it is not possible to set the axial angle between the joining partners. The final position of the rotational friction welding tools relative to one another cannot be precisely defined, and therefore this may result in an axial displacement of the joining partners relative to one another. This may be undesirable from the process point of view. Furthermore, the use of a friction welding method is limited to cross sections or more than 35 mm$^2$.

For this reason, the subject-matter was based on the object of providing a welding method with which aluminium stranded leads can be securely connected to connection parts in axially defined positions.

This object is achieved according to the subject-matter by a connection of an aluminium stranded lead to a connection part, comprising a stripped end of the aluminium stranded lead and a metal connection part which is materially connected (materially joined, materially fit) to the stripped end of the aluminium stranded lead, in which an end face of the stripped end of the aluminium stranded conductor is welded to the connection part by means of torsional ultrasonic welding. It has been found that, by means of torsional ultrasonic welding, a solid welded connection can be produced while avoiding air inclusions between the aluminium strands. In the case of torsional ultrasonic welding, the joining partners, namely the aluminium stranded lead and the connection part, are moved relative to one another by means of axial relative movements. The torsional movement of the joining partners relative to one another takes place in the ultrasonic range, for example at a frequency of 20 kHz or more. The joining partners are in this case rotated relative to one another in minimum amplitudes, for example 10-100 µm, preferably 20-40 µm or between 0.1° and 5°. Since the welding energy is introduced by torsional vibration of the joining partners, the weld surfaces no longer have to be rotationally symmetrical. Instead, different geometries of contact parts, such as rectangles, ovals or ellipses, can now be welded to one another. All that is required is that the connection part completely covers the end face of the aluminium strands of the aluminium stranded lead. Since in torsional ultrasonic welding the contact parts may also be bent sheet-metal parts, it is possible to replace the contact parts which are conventionally used in rotational friction welding, such as expensive forged cable terminals for example, by inexpensive bent sheet-metal parts.

SUMMARY OF THE INVENTION

It is also possible to provide the connection part with a relief structure in the weld region so that the aluminium conductor is welded to the contact part in such a way that the weld bead in the region of the relief is located around the weld seam. By way of example, a pot-shaped structure may be provided by means of deep-drawing or other processes, wherein The diameter of this pot is somewhat larger than the diameter of the aluminium stranded lead, so that the weld bead in the region of the pot solidifies in particular in the annular space between the aluminium stranded lead and the inner diameter of the pot.

According to one advantageous embodiment, it is proposed that a compression part which surrounds the stripped end of the aluminium stranded lead compresses the aluminium strands to form a bundle. The compression may be such that the bundle is free from air inclusions. After being stripped, the aluminium strands can be compacted by the compression part. In the process, the strands are pressed against one another by means of a mechanical compression in such a way that cavities are reduced or eliminated. The compressed end of the aluminium stranded lead can then be machined (cutting shaping) in order to remove aluminium oxides on the end face. By way of example, the end face may be milled down so that a flat end face is formed. The end face may also be ground.

Since cavities between the aluminium strands are avoided, this prevents any corrosion from occurring in the region of the weld seam. In the region of the weld seam, the aluminium stranded lead can be processed in a manner similar to a solid material, since cavities are avoided.

According to one advantageous embodiment, the compression part may be formed as a sleeve or a splice crimp terminal. Before the aluminium stranded lead is welded to the connection part, the sleeve may be pushed onto the stripped end of the aluminium stranded lead and compressed. A splice crimp terminal may be formed for example in such a way that a piece of continuous strip, for example made from aluminium or alloys, for example having a sheet thickness of 1 to 1.5 mm, is cut to size and applied to the stripped end of the aluminium stranded lead. In so doing, the flat strip material is placed around the strands and compressed, so that a solid, compacted region is formed on the end face of the aluminium stranded conductor, which is suitable for welding the end face to a contact part. As a result, it is possible to produce flexible connections in an inexpensive, quick and uncomplicated manner. The costs for an aluminium sleeve, and also the complex processing, in particular the joining of the individual sleeves to the cables and the positioning of the cables with the sleeve in the compression tool, can be saved. The flat strip material may be supplied for example from a continuous strip material.

Crushing forces are generated both in the case of ultrasonic welding and also in the case of rotational friction welding. Since the crushing forces are much lower in the case of ultrasonic welding, particularly in the case of torsional ultrasonic welding, than in the case of rotational friction welding, the sleeve or the splice crimp terminal can be dimensioned with smaller wall thicknesses. For example, it is possible that the wall thicknesses of the sleeve or of the splice crimp terminal are between 0.5 and 2 mm. It is also possible that the axial length of the splice crimp terminal or of the sleeve may be smaller than in the case of rotational friction welding. By way of example, it is possible that the sleeve is shorter than 5 cm, preferably shorter than 3 cm, particularly preferably shorter than 1 cm. Such an axial length is sufficient to absorb the crushing forces that occur.

During the further welding, the aluminium stranded lead may be clamped into a suitable holder of a welding tool, which absorbs the axial forces that occur during welding. In this case, it is possible for example that the connection part in the weld region is placed onto the end face of the compressed aluminium stranded lead and is loaded axially by the sonotrode in the direction of the aluminium stranded lead. In this case, it is possible for example that the coupling face of the sonotrode is connected to the connection part with a high contact pressure or an aggressive toothing. As a result, the welding movement of the sonotrode is transferred to the connection part, whereas the compressed aluminium stranded lead can be fixedly clamped in the holder. By virtue of the relative movement of the weld partners relative to one another, energy in the form of friction is introduced in the welding plane, so that a welding of the connection part and aluminium stranded lead takes place under the application of pressure.

According to one advantageous exemplary embodiment, it is proposed that the compression part is the holder. The holder of the tool may be formed for example in such a way that it compresses and compacts the aluminium strands as explained above. In this case, the use of a sleeve or of a splice crimp terminal would be superfluous. The ultrasonic welding tool, in particular the holder, can also be used to achieve a sufficiently high compacting of the aluminium stranded lead.

As already explained above, it is proposed according to one advantageous exemplary embodiment that a weld seam between the end face of the stripped end of the aluminium stranded lead together with the compression part and the connection part is free from cavities.

According to one advantageous exemplary embodiment, the compression part may be formed from aluminium or alloys thereof. In particular, the compression part may be plastically deformable, so that a sufficient compacting of the aluminium strands of the aluminium stranded lead can be achieved.

According to one advantageous exemplary embodiment, the connection part may be a flat lead. This may be for example a flat lead which extends over more than 30 cm. It is also possible that the flat lead is a bent sheet-metal part which is connected at one end to the aluminium stranded lead and has at the other end an opening for a bolt or a screw.

As already explained above, in the case of torsional ultrasonic welding it is no longer necessary that the joining partners are rotationally symmetrical. For this reason, it is proposed that the connection part is an L-shaped flat lead, wherein one leg of the flat lead is connected to the aluminium stranded lead. The flat lead may for example be punched from a strip unwound from a coil or a sheet. In the case of punching, it is possible for example to shape the flat lead directly.

According to one advantageous exemplary embodiment, it is proposed that the connection part is a round lead. The connection between two round leads, the aluminium stranded lead and a further round lead, is also possible according to the subject-matter. The round lead may likewise be an aluminium stranded lead or else a different round lead, for example a round lead formed of a solid material. It is also possible that the round lead is a connection bolt.

It is proposed that the round lead is butt-connected to the aluminium stranded lead. In this case, the round lead for example may be clamped into the sonotrode, and the aluminium stranded lead into the holder. The sonotrode is moved in the direction of the holder and a contact pressure occurs between the round lead and the aluminium stranded lead, which together with the torsional relative movement of the joining partners relative to one another in the ultrasonic range leads to a sufficiently large introduction of energy.

Another aspect is a method for producing a connection of an aluminium stranded lead to a connection part, which comprises stripping one end of the aluminium stranded lead and materially connecting the stripped end of the aluminium stranded lead to a metal connection part, which is characterised in that an end face of the stripped end of the aluminium stranded lead is welded to the metal connection part by means of torsional ultrasonic welding.

Another aspect is the use of a connection as described above for a motor vehicle power cable, in particular a battery cable.

The invention will be explained in more detail below with reference to a drawing which shows exemplary embodiments.

DETAILED DESCRIPTION OF SPECIFIC EMBODIMENTS

Figure 1:
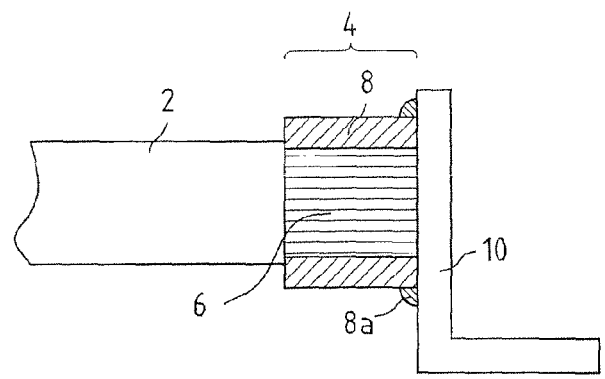
FIG. 1 shows a first possible welded connection of an aluminium stranded lead to a flat lead.

FIG. 1 shows an aluminium stranded lead 2 with a stripped end 4. The aluminium strands 6 can be seen at the stripped end 4. Furthermore, FIG. 1 shows a compression part 8 and also an L-shaped connection plate 10. The aluminium stranded lead 2 shown in FIG. 1 is compressed at its stripped end 4 by means of a sleeve 8 in such a way that the aluminium leads 6 are compacted, so that air inclusions between the aluminium strands 6 are substantially eliminated. The end face of the aluminium stranded lead 2 which has been compacted in this way is freed of aluminium oxide by machining processes for example. Immediately thereafter, the stripped end 4 together with the sleeve 8 is clamped in a holder of an ultrasonic welding tool. A sonotrode is arranged on the connection plate 10 on the side remote from the stripped end and is securely connected to the connection plate 10. Thereafter, the connection plate 10 is pressed against the stripped end of the aluminium stranded lead 2. During the torsional ultrasonic welding, the aluminium stranded lead 2 is rotated in the axial direction relative to the connection plate 10 or vice versa. The rotational movements are minimal and result in displacements of less than 1 mm. The rotational movements relative to one another are in the ultrasonic range, i.e. the joining partners are moved relative to one another at frequencies of more than 10 kHz, for example 20 kHz. The weld bead 8a that forms may be accommodated for example in the bent sheet-metal part 10 if a depression has been formed therein (not shown).

By virtue of torsional ultrasonic welding, it is possible to weld together joining partners in short intervals which are not rotationally symmetrical in a welding time of 1.5 seconds or less, for example 1.2 seconds. The axial final position of the joining partners relative to one another can be defined by means of torsional ultrasonic welding.

Figure 2:
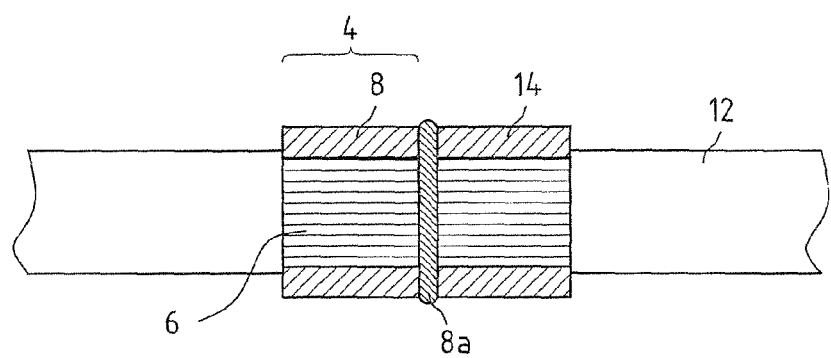
FIG. 2 shows a second possible welded connection of an aluminium stranded lead to a round lead.

FIG. 2 shows a further possibility for welding an aluminium stranded lead 2 to a round lead 12. In this case, it is possible for example that the compression part 8 is a splice crimp terminal and the round lead 12 is likewise an aluminium stranded lead. The compression part 8 may also be a holder of the welding tool. The compression part 14 may for example be a sleeve or the sonotrode of the ultrasonic welding tool. A weld bead 8a forms between the joining partners. On account of the compression by means of the compression parts 8, 14, the strands 6 are substantially free from air inclusions.

Figure 3:
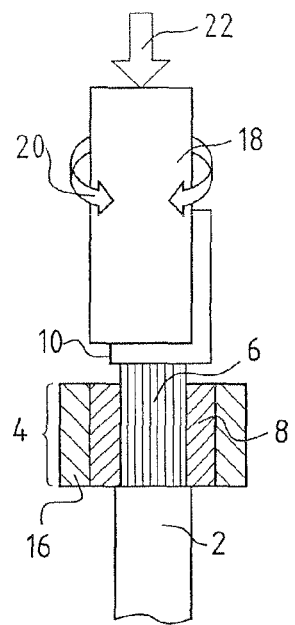
FIG. 3 shows a schematic view of a torsional ultrasonic welding process.

FIG. 3 schematically shows the joining process according to FIG. 1. It can be seen that the aluminium stranded lead 2 is compressed by a sleeve 8 at its stripped end 4. The sleeve 8 is pushed over the stripped end 4 and compresses the strands 6 of the aluminium stranded lead 2 in such a way that these are compacted and free from air inclusions. The aluminium sleeve 8 may for example have a wall thickness of less than 2 mm. The aluminium sleeve 8 may furthermore be for example shorter than 5 cm, preferably shorter than 3 cm, since the crushing forces which are introduced by the torsional ultrasonic welding are lower than in the case of rotational friction welding. As shown in FIG. 3, the sleeve 8 is clamped in a holder 16. The holder 16 could likewise serve as the compression part (not shown). The holder 16 is fixed both in the axial and in the radial direction.

The bent sheet-metal part 10 is arranged on a sonotrode 18. The sonotrode 18 presses the bent sheet-metal part 10 in a direction 20 against the aluminium sleeve 8. Furthermore, the sonotrode 18 carries out rotational movements in the direction 20 with small displacements, so that the bent sheet-metal part 10 is moved relative to the sleeve 8. In order to transfer the rotational movement from the sonotrode 18 to the bent sheet-metal part 10, the sonotrode 18 is pressed firmly against the bent sheet-metal part 10 and may also surround the latter for example. During the joining process, energy is introduced into the joining point between the bent sheet-metal part 10 and the sleeve 8 by means of the relative movement in the direction 22, so that the material at that point is heated and a weld seam is formed. During this process, the temperature may be below the melting temperature of the metal joining partners. The axial positioning of the joining partners—aluminium sleeve 8 and bent sheet-metal part 10—relative to one another can be defined in the case of torsional ultrasonic welding.

Figure 4:
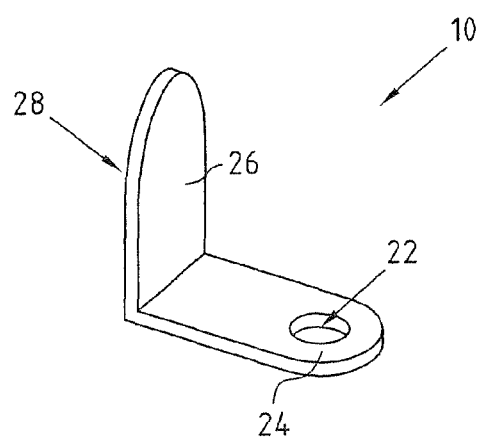
FIG. 4 shows a view of a connection part.

FIG. 4 shows a bent sheet-metal part 10. The bent sheet-metal part 10 is L-shaped and has on one leg a bore 22 for receiving a bolt or a screw. The bore 22 may be surrounded by a support or screwing surface 24 which is tin-plated. The second leg of the bent sheet-metal part has on one side 26 a contact surface for the sonotrode 18, via which the axial movement in the direction 22 can be introduced into the bent sheet-metal part 10. The other side 28 of the bent sheet-metal part 10 may be free from tin, so that a good weld seam is obtained. The first side 26 is accessible for the sonotrode 18, so that the bent sheet-metal part 10 can be pressed against the sleeve 8.

Figure 5:
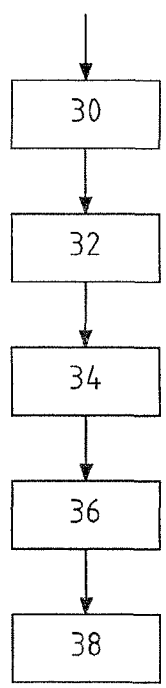
FIG. 5 shows a flow chart of a method according to one exemplary embodiment.

FIG. 5 schematically shows a flow chart of a method according to the invention. In a first step 30, a continuous aluminium strip can be unwound from a coil and can be supplied to a splice crimping tool. To this end, in one operation the aluminium strip is cut, shaped around the strands of the aluminium stranded lead and compressed. As a result, the aluminium strands of the aluminium stranded conductor are compacted and cavities are prevented. This may take place in a step 32. In a step 34, the stripped end which is compressed by the compression part is clamped in a holder. In a step 36, an L-shaped bent sheet-metal part is introduced onto a sonotrode and the sonotrode presses the bent sheet-metal part against the end face of the aluminium stranded lead and the compression part. In a step 38, both a force in the axial direction towards the aluminium stranded lead and also a torsional movement are introduced into the bent sheet-metal part by means of the sonotrode. As a result, the bent sheet-metal part moves relative to the stripped end of the aluminium stranded lead and a sufficient welding energy is applied.

The resulting welded connection exhibits an axially defined position of the joining partners relative to one another and is inexpensive to produce.

What is claimed is:

1. A method for connecting an aluminum stranded lead to a connection part, the method comprising:
   stripping one end of the aluminum stranded lead;
   surrounding the stripped end of the aluminum stranded lead with a compression part to compress the aluminum strands forming a bundle;
   materially connecting an end face of the stripped end of the aluminum stranded lead to a metal connection part via a butt weld generated by torsional ultrasonic welding; and
   materially connecting the compression part to the metal connection part via the butt weld generated by the torsional ultrasonic welding, wherein the metal connection part includes a flat face connected substantially orthogonal to the aluminum stranded lead at the butt weld.

2. A method according to claim 1 further comprising electrically connecting the connection part to a motor vehicle battery cable.

3. A method according to claim 1, wherein the compression part is formed in such a way that the strands of the aluminum stranded lead bear against one another without cavities in the region of the compression part.

4. A method according to claim 1, wherein the compression part is a sleeve or a splice crimp terminal.

5. A method according to claim 4, wherein the compression part is formed so as to absorb crushing forces of a torsional ultrasonic welding tool.

6. A method according to claim 1, wherein the compression part is a holder of a torsional ultrasonic welding tool.

7. A method according to claim 1, wherein a weld seam between the end face of the stripped end of the aluminum stranded lead together with the compression part and the connection part is free from cavities.

8. A method according to claim 1, wherein the compression part is formed from aluminum or alloys thereof.

9. A method according to claim 1, wherein the connection part is a flat lead.

10. A method according to claim 1, wherein the connection part is an L-shaped lead having one leg of the lead connected by the weld to the aluminum stranded lead.

\* \* \* \* \*

UNITED STATES PATENT AND TRADEMARK OFFICE
CERTIFICATE OF CORRECTION

PATENT NO.         : 8,448,836 B2
APPLICATION NO.    : 12/990348
DATED              : May 28, 2013
INVENTOR(S)        : Schloms et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 88 days.

Signed and Sealed this
Eighth Day of September, 2015

Michelle K. Lee
*Director of the United States Patent and Trademark Office*